United States Patent [19]

Tanaka et al.

[11] Patent Number: 5,900,450
[45] Date of Patent: May 4, 1999

[54] THREE-DIMENSIONALLY CONNECTED SILICA SPHERE-RESIN COMPOSITE AND METHOD FOR PRODUCTION THEREOF

[75] Inventors: Yuko Tanaka, Kawanishi; Muneaki Yamaguchi; Hiromasa Ogawa, both of Ikeda; Katsutoshi Tanaka, Toyonaka, all of Japan

[73] Assignee: Agency of Industrial Science & Technology, Tokyo-To, Japan

[21] Appl. No.: 08/862,293

[22] Filed: May 22, 1997

Related U.S. Application Data

[63] Continuation of application No. 08/498,519, Jul. 5, 1995, abandoned.

[30] Foreign Application Priority Data

Jul. 5, 1994 [JP] Japan ..................................... 6-177534

[51] Int. Cl.⁶ .......................... C08K 3/36; C01B 33/141
[52] U.S. Cl. .......................... 524/493; 524/492; 524/265; 524/266; 524/588; 524/731; 523/212; 523/213; 423/335; 423/336; 423/338; 423/339; 423/349
[58] Field of Search .................................... 524/493, 492, 524/265, 266, 588, 731; 523/212, 213; 423/335, 338, 349, 339

[56] References Cited

U.S. PATENT DOCUMENTS

| | | | |
|---|---|---|---|
| 4,957,818 | 9/1990 | Obayashi et al. ........................ | 428/451 |
| 4,983,369 | 1/1991 | Barder et al. ............................ | 423/338 |
| 5,009,688 | 4/1991 | Nakanishi ................................ | 65/18.3 |
| 5,028,360 | 7/1991 | Ito et al. .................................. | 423/338 |
| 5,102,763 | 4/1992 | Winnik et al. ........................... | 430/106 |
| 5,230,953 | 7/1993 | Tsugeno et al. ......................... | 423/338 |
| 5,256,386 | 10/1993 | Nystrom et al. ......................... | 423/338 |
| 5,294,426 | 3/1994 | Sekine et al. ............................ | 423/338 |
| 5,376,347 | 12/1994 | Ipponmatsu et al. .................... | 423/338 |
| 5,422,384 | 1/1995 | Samuels et al. ......................... | 523/170 |

OTHER PUBLICATIONS

Journal of Non–Crystalline Solids 139 (1992), "Phase separation in silica sol–gel system containing polyacrylic acid—I. Gel formation behavior and effect of solvent composition", pp. 1–13, Kazuki Nakanishi et al.

Polymer Bulletin 31, "A polyamide–silica composite prepared by the sol–gel process", pp. 323–330 (1993), Shuhong Wang et al.

Macromolecules 1993, 26, "Poly(vinyl acetate) Silica Filled Materials: Material Properties of in Situ vs Fumed Silica Particles", pp. 3702–3712, Christine J.T. Landry et al.

*Primary Examiner*—James J. Seidleck
*Assistant Examiner*—Olga Asinovsky
*Attorney, Agent, or Firm*—Nikaido Marmelstein Murray & Oram, LLP

[57] ABSTRACT

A method for preparing a three dimensionally connected silica spheres-resin composite, which comprises hydrolyzing and polymerizing a low molecular weight polyalkoxysilane in the presence of an acid catalyst in a mixed solution of the low molecular weight polyalkoxysilane and a water-soluble polymer in a solvent mixture of water and alcohol to obtain a three dimensional connected silica spheres, impregnating the three dimensional connected silica spheres with at least one material selected from resin-forming monomers and resin-forming prepolymers, and curing the material. The composite obtained by the above method retains its strength even at high temperatures where the organic matter undergoes pyrolysis or burnout.

9 Claims, 1 Drawing Sheet

THREE-DIMENSIONALLY CONNECTED SILICA SPHERE-RESIN COMPOSITE AND METHOD FOR PRODUCTION THEREOF

This is a file-wrapper continuation application of patent application Ser. No. 08/498,519, filed on Jul. 5, 1995, now abandoned.

FIELD OF THE INVENTION

The present invention relates to a three dimensionally connected silica spheres-resin composite and a method for production thereof.

BACKGROUND OF THE INVENTION

Generally, silica particles show high oil absorption and high level filling with said particles is difficult to attain. Accordingly, it is difficult to produce high-fill silica-polymer composite materials and the like. Even when high level filling with silica and the like is possible, the materials obtained have unsatisfactory physical properties, as discussed below, and can hardly be submitted to practical use.

Thus, for example, in the case of silica-polymer composite materials prepared by random closest filling with powdery or flaky quartz glass powder, the maximum fill is 77% by weight. In the case of high silica-filled composite materials having a three-dimensional structure as synthesized from compatible polymer blend systems in a phase separation system utilizing the sol-gel process, the maximum fill is 80% by weight.

Although composite materials prepared from resins or the like with an inorganic material such as silica or glass have an increased rigidity (elasticity) with the increase in fill percentage, they have an decreased impact resistance, among others, and are hard and fragile or brittle. As a result, the high silica or like material-filled composite materials mentioned above are thus poor in shock resistance and like properties. Epoxy resin-based composite materials high filled with an inorganic material such as silica or glass, for instance, rapidly lose their rigidity at temperatures above the glass transition point of the resin. They are thus poor in high temperature stability.

SUMMARY OF THE INVENTION

It is a primary object of the present invention to provide a three dimensionally connected silica spheres-resin composite, which, in spite of its high silica content, shows no tendency toward sudden rigidity fall at temperatures above the glass transition temperature and has good high temperature stability.

The present invention is based on the finding that when a low polymer of an alkoxysilane is subjected to hydrolysis and polymerization in a mixed solution containing the alkoxysilane low polymer and a water-soluble polymer in a mixed solvent composed of water and alcohol in the presence of an acid catalyst, a new structure having unique physical properties can be obtained.

Thus, the present invention is concerned with the following three dimensionally connected silica spheres-resin composite and the following method for production thereof.

1. A three dimensionally connected silica spheres-resin composite comprising a three-dimensional network structure consisting of spherical silica particles having the following structural and dynamic characteristics and a resin present in the internal pores thereof.
   (1) It comprises three-dimensionally interconnected spherical silica particles having a diameter of 6 to 30 μm;
   (2) Said spherical silica particles have, on the surface thereof, pores having a radius of 5 to 10 nm and have a specific surface area of 300 to 400 $m^2/g$;
   (3) The cross-sectional area of the bond interconnecting two spherical silica particles is within the range of ½ to ¼ of the maximum cross-sectional area of that particle smaller in maximum cross-sectional area;
   (4) The particle surface of said spherical silica particles is wholly or partly covered with a water-soluble polymer;
   (5) There are mutually communicating voids formed within said network structure and the void content is 40 to 60% on the whole network structure basis;
   (6) The silica content is 60 to 80% by weight on the whole network structure basis;
   (7) When said network structure is heat-treated by keeping in air both at 600° C. for 5 hours and at 800° C. for 3 hours, the network structure substantially remains intact;
   (8) Said network structure can undergo machining and has an elasticity modulus of 1.5 to 2.0 GPa at temperatures below the glass transition temperature and an elasticity modulus of 0.18 to 0.25 GPa at temperatures between the glass transition point and 300° C.

2. A method of producing the composite described under 1, characterized in that a three-dimensional network structure obtained by causing a low molecular weight polyalkoxysilane to undergo hydrolysis and polymerization reactions in the presence of an acid catalyst in a mixed solution of said low molecular weight polyalkoxysilane and a water-soluble polymer in a solvent mixture of water and alcohol is impregnated with a resin-forming monomer and/or prepolymer and the impregnated structure is subjected to curing conditions.

3. A method of producing the composite described under 1, characterized in that a three-dimensional network structure obtained by causing a low molecular weight polyalkoxysilane to undergo hydrolysis and polymerization reactions in the presence of an acid catalyst in a mixed solution of said low molecular weight polyalkoxysilane and a water-soluble polymer in a solvent mixture of water and alcohol is impregnated with a thermoplastic resin and the impregnated structure is subjected to curing conditions.

4. A three dimensionally connected silica spheres-resin composite comprising a three-dimensional network structure consisting of spherical silica particles having the following structural and dynamic characteristics and a resin present in the internal pores thereof.
   (1) It comprises three-dimensionally interconnected spherical silica particles having a diameter of 6 to 30 μm;
   (2) Said spherical silica particles have, on the surface thereof, pores having a radius of 5 to 10 nm and have a specific surface area of 300 to 400 $m^2/g$;
   (3) The cross-sectional area of the bond interconnecting two spherical silica particles is within the range of ½ to ¼ of the maximum cross-sectional area of that particle smaller in maximum cross-sectional area;
   (4) There are mutually communicating voids formed within said network structure and the void content is 40 to 60% on the whole network structure basis;
   (5) The silica content is 60 to 80% by weight on the whole network structure basis;
   (6) When said network structure is heat-treated by keeping in air both at 600° C. for 5 hours and at 800° C. for 3 hours, the network structure substantially remains intact;

(7) Said network structure can undergo machining and has an elasticity modulus of 1.5 to 2.0 GPa at temperatures below the glass transition point and an elasticity modulus of 0.18 to 0.25 GPa at temperatures between the glass transition point and 300° C.

5. A method of producing the composite described under 4, characterized in that a three-dimensional network structure obtained by causing a low molecular weight polyalkoxysilane to undergo hydrolysis and polymerization reactions in the presence of an acid catalyst in a mixed solution of said low molecular weight polyalkoxysilane and a water-soluble polymer in a solvent mixture of water and alcohol, and then decomposing said water-soluble polymer is impregnated with a resin-forming monomer and/or prepolymer and the impregnated structure is subjected to curing conditions.

6. A method of producing the composite described under 4, characterized in that a three-dimensional network structure obtained by causing a low molecular weight polyalkoxysilane to undergo hydrolysis and polymerization reactions in the presence of an acid catalyst in a mixed solution of said low molecular weight polyalkoxysilane and a water-soluble polymer in a solvent mixture of water and alcohol, and then decomposing said water-soluble polymer is impregnated with a thermoplastic resin and the impregnated structure is subjected to curing conditions.

DETAILED DESCRIPTION OF THE INVENTION

Figure 1:
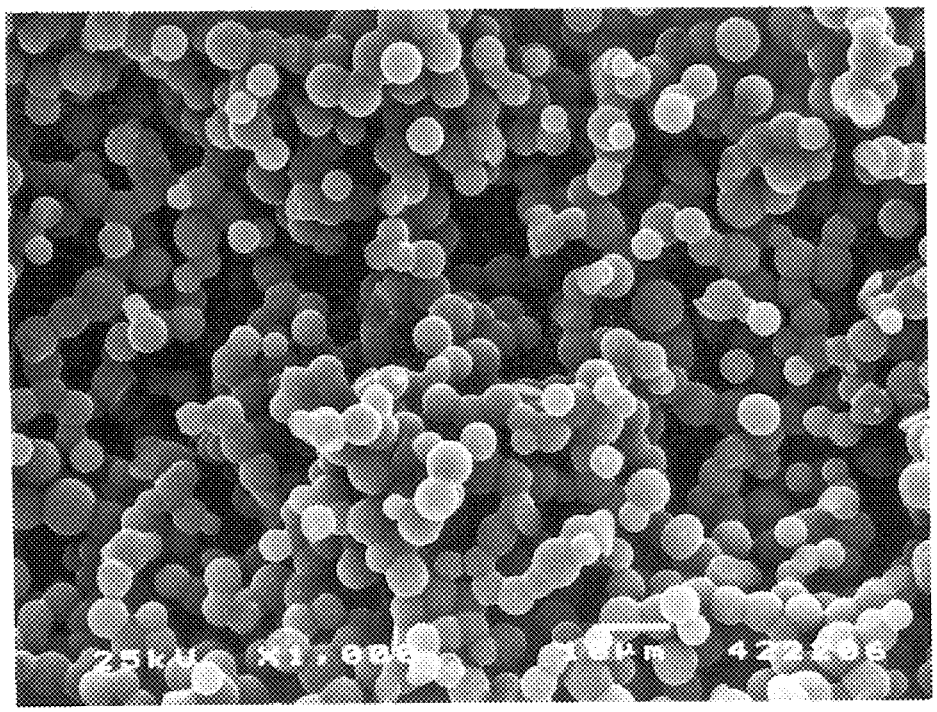
FIG. 1 is a photomicrograph, taken on a scanning electron micrograph (SEM), showing the particle structure of the three-dimensional network structure comprising spherical silica particles as obtained in Example 1.

In the following, the present invention is described in further detail. Unless otherwise indicated, the inventions described above in paragraphs 1 through 6 are referred to as the first aspect through the sixth aspect of the invention in the order mentioned.

The first aspect of the invention is characterized in that a resin is present in the internal pores of a three-dimensional network structure having the following characteristics (1)–(8).

(1) It comprises three-dimensionally interconnected spherical silica particles having a diameter of 6 to 30 $\mu$m. The phrase "three-dimensionally interconnected" means that one spherical silica particle is bound to one or more other spherical silica particles. The spherical silica particles mentioned above are substantially noncrystalline. The diameter is generally about 6 to 30 $\mu$m, preferably 10 to 20 $\mu$m.

(2) Said spherical silica particles have, on the surface thereof, pores having a radius of 5 to 10 nm and have a specific surface area of 300 to 400 m$^2$/g. The pores existing on the spherical silica particle surface generally have a radius of about 5 to 10 nm, preferably 7 to 8 nm, but there may also be present a certain percentage of pores which have a radius outside the above range provided that the above specific surface area requirement is satisfied.

(3) The cross-sectional area of the bond interconnecting two spherical silica particles is within the range of ½ to ¼ of the maximum cross-sectional area of that particle smaller in maximum cross-sectional area. This means that when one spherical silica particle and one of the plurality of spherical silica particles bound thereto are compared, the bond between the two has a cross-sectional area of ½ to ¼ of the maximum cross-sectional area of the particle smaller in maximum cross-sectional area. Therefore, the bonds among spherical silica particles have the so-called "constricted in the middle" shape. A certain percentage of bonds having a cross-sectional area outside the above range may exist provided that the effects of the invention will not be adversely affected thereby.

(4) The particle surface of said spherical silica particles is wholly or partly covered with a water-soluble polymer. The water-soluble polymer is not limited to any particular species provided that it is soluble in water and compatible with the alcohol used. As examples that have such properties, there may be mentioned, among others, polyacrylic acid, polyethylene glycol, polyvinyl alcohol, polyvinyl acetate, water-soluble proteins, and sodium polystyrenesulfonate. The spherical silica particle surface is wholly or partly covered with such a water-soluble polymer and it is desirable that not less than 90% of said surface should be covered with such polymer.

(5) There are mutually communicating voids formed within said network structure and the void content is 40 to 60% on the whole network structure basis. In the present invention, the phrase "mutually communicating voids" means that individual pores are not independent but three-dimensionally interconnected with one another. The structure may contain closed pores of cells unless they should substantially lessen the effects of the present invention. The above-mentioned void content is generally about 40 to 60% but preferably 45 to 55%.

(6) The silica content is 60 to 80% by weight on the whole network structure basis. Said content is generally about 60 to 80% by weight but preferably 60 to 70% by weight.

(7) When said network structure is heat-treated by keeping in air both at 600° C. for 5 hours and at 800° C. for 3 hours, the network structure substantially remains intact. The phrase "substantially remains intact" means that the heat-treated structure does not show such hardening (embrittlement) resulting in disintegration as shown later herein in comparative examples.

(8) Said network structure can undergo machining and has an elasticity modulus of 1.5 to 2.0 GPa at temperatures below the glass transition point and an elasticity modulus of 0.18 to 0.25 GPa at temperatures between the glass transition point and 300° C. Said machining includes, among others, cutting and shaping.

The composite according to the first aspect of this invention comprises a resin present within the internal pores of the above-described structure. The term "pores" as used in this specification mean both independent air cells and continuous (intercommunicating or penetrating) air cells. Furthermore, the composite of this invention includes both (1) said structure filled completely with said resin (completely filled composite) and (2) said structure not completely filled with said resin (incompletely filled composite). The incompletely filled composite includes but is not limited to the composite in which only the surface of the pores is covered with the resin, the composite in which the diameter of pores has been reduced by the presence of the resin, and the composite in which only some of the available pores have been filled with the resin.

The resin mentioned above is not restricted in kind but any of the known thermosetting resins and thermoplastic resins can be employed only if the internal pores of said structure may be impregnated therewith. The thermosetting resin includes but is not limited to epoxy resin, polyimide resin, unsaturated polyester resin, silicone resin, and phenolic resin. The thermoplastic resin includes but is not limited to polyethylene, polypropylene, polystyrene, polyamide, poly(vinyl chloride) and methacrylic polymer.

The second and third aspects of this invention are concerned with the production technology for the above-described composite.

In accordance with the second aspect of this invention, a three-dimensional network structure obtained by causing a low molecular weight polyalkoxysilane to undergo hydrolysis and polymerization reactions in the presence of an acid catalyst in a mixed solution of said low molecular weight polyalkoxysilane and a water-soluble polymer in a solvent mixture of water and alcohol is impregnated with a resin-forming monomer and/or prepolymer and the impregnated structure is subjected to curing conditions.

In accordance with the third aspect of this invention, a three-dimensional network structure obtained by causing a low molecular weight polyalkoxysilane to undergo hydrolysis and polymerization in the presence of an acid catalyst in a mixed solution of said low molecular weight polyalkoxysilane and a water-soluble polymer in a solvent mixture of water and alcohol is impregnated with a thermoplastic resin and the impregnated structure is subjected to curing conditions.

In the second and third aspects of this invention, said three-dimensional network structure is produced in the first place as follows. Thus, in a mixed solution of a low molecular weight polyalkoxysilane and a water-soluble polymer in a solvent mixture of water and alcohol, the hydrolysis reaction and polymerization reaction of said low molecular weight polyalkoxysilane are carried out in the presence of an acid catalyst to provide a three-dimensional network structure comprising spherical silica particles.

The mechanisms of formation of the above structure in the said method of the invention are as follows. Simultaneously with the above polymerization reaction, phase separation occurs in the metastable region, whereby nucleation for silica particles begins. In the course of the growth of silica particles, the system goes into the unstable region (spinodal decomposition region), where the silica particle growth is accompanied by interparticle bonding. As a result, a three-dimensional network structure comprising spherical silica particles is formed.

In this connection, Nakanishi and his colleagues report, in the Journal of Non-Crystalline Solids, 139 (1992) pp. 1–13, that they obtained entangled silica structures by gelating a homogeneous solution composed of tetraethoxysilane monomer or tetramethoxysilane monomer, polyacrylic acid, water, methanol or ethanol, and nitric acid at 60° C. to thereby cause phase separation into a silica phase and a polymer phase within the unstable region defined by the spinodal curve, and then washing away the polymer phase.

On the contrary, the structure formation according to the present invention is effected while controlling the change in solvent concentration so that the system shifts into the unstable region after a certain extent of spherical silica particle growth in the metastable region where nucleation and growth occur. The method of the present invention is essentially different from the method mentioned above which starts with an alkoxysilane monomer.

The monomer to serve as the alkoxysilane low polymer is not limited to any particular species but includes, among others, monomers having an alkoxy group containing 1 to 4 carbon atoms, such as tetramethoxysilane and tetraethoxysilane. Suited for use as said low polymer are those resulting from polymerization of generally about 4 to 10 molecules of such a monomer. The low polymer may be any per se known one or a commercially available one.

The water-soluble polymer is not limited to any particular species provided that it is compatible with the alcohol to be used. As examples, there may be mentioned polyacrylic acid, polyethylene glycol, polyvinyl alcohol, polyvinyl acetate, water-soluble proteins, and sodium polystyrenesulfonate, etc. These may be used either alone or in combination. The water-soluble polymer may be used in the form of an aqueous solution prepared prior to mixing.

As a result of the presence of the water-soluble polymer in the reaction system according to the method of the present invention, the reactions proceed according to the following mechanisms. Thus, as the polymerization reaction of the alkoxysilane low polymer proceeds in the compatible system comprising the alkoxysilane low polymer and water-soluble polymer, the compatibility between the polymerization product and water-soluble polymer decreases and said system enters the two-phase region (phase separation region), whereupon the same components begin to gather respectively and phase separation starts. In this process, an entangled structure (three-dimensional interpenetrating structure) is formed. Therefore, it is possible, by immobilizing the system at this stage by gel formation, to obtain a desired three-dimensional network structure. The three-dimensional network structure varies depending on the stage of phase separation at which said gel formation occurs. Therefore, the physical properties (molecular weight, viscosity, etc.) of the water-soluble polymer and the amount thereof have great influences on the properties of the three-dimensional network structure formed in accordance with the present invention.

When the water-soluble polymer is absent in the reaction system or the content thereof is too small, disintegrated silica fragments alone are formed, failing to form the desired three-dimensional network structure. On the other hand, when the water-soluble polymer content is excessive, a mass composed of a swollen body of the water-soluble polymer and fine silica particles dispersed therein is formed.

As regards the proportions of said low polymer and water-soluble polymer, it is recommendable to use generally about 10 to 40 parts by weight, preferably 25 to 35 parts by weight, of the water-soluble polymer per 100 parts by weight of the alkoxy-silane low polymer. When the proportion of the water-soluble polymer is too small, any three-dimensional network structure comprising mutually interconnected spherical silica particles will not be formed. In that case, more particularly, a state is attained in which the water-soluble polymer is found dispersed in spherical form in silica glass. Upon drying, the glass is disintegrated into small pieces, giving granules about 1 to 2 mm in size. On the other hand, when the water-soluble polymer is used in an excessively large proportion, a state results in which silica particles are dispersed in the water-soluble polymer, hence any desired structure can not be obtained.

The alcohol to be used in the water-alcohol mixed solvent is not limited to any particular species provided that it can serve as the solvent. Thus, for example, lower alcohols containing 1 to 4 carbon atoms, such as methyl alcohol, ethyl alcohol, propyl alcohol, isopropyl alcohol and butyl alcohol, can suitable be used.

The proportions of water and the alcohol are generally 40 to 60% by weight of water and 60 to 40% by weight of alcohol, preferably 53 to 57% by weight of water and 47 to 43% by weight of alcohol. When the water-soluble polymer is used in the form of an aqueous solution, the amount of water in said aqueous solution should be included in calculating the proportion of water in said mixed solvent.

The concentration of the solids comprising the alkoxysilane low polymer and the water-soluble polymer in said mixed solvent is generally about 40 to 60% by weight but preferably 42 to 46% by weight.

As the acid catalyst, there may be mentioned inorganic acids such as hydrochloric acid, nitric acid and sulfuric acid as well as organic acids such as acetic acid, oxalic acid and formic acid. Among these, hydrochloric acid, nitric acid and acetic acid are preferred. The acid catalyst is used generally in an amount of about 0.5 to 2% by weight, preferably 1 to 1.2% by weight, based on the whole reaction system components.

The order of mixing of these alkoxysilane low polymer, water-soluble polymer, water-alcohol mixed solvent and catalyst is arbitrary provided that uniform mixing of these can be assured. Thus, for example, these may be mixed up all at once, or the alcohol may be added to the alkoxysilane low polymer, followed by admixing with an aqueous solution of the water-soluble polymer and further by addition of the acid catalyst. The water-alcohol mixed solvent may be prepared in situ by adding water and the alcohol separately.

The structure of the present invention can be produced by mixing these components uniformly, with stirring as necessary, and then allowing the mixture to stand for maturation or aging. The aging temperature is generally about 20 to 25° C. The aging period is generally about 10 to 35 days but may be shorter or longer depending on the starting material species, aging temperature and other conditions.

The elastic modulus at ordinary and high temperatures as well as high temperature stability of an example of the three-dimensional network structure according to this invention and an example of the cured epoxy resin (bisphenol F epoxy resin cured with himic anhydride).

|  | This Invention | Epoxy resin |
|---|---|---|
| Elastic modulus at ordinary temperature | 1.5 GPa | 3.0 GPa |
| Elastic modulus at high temperature ($\geq$ glass transition temperature) | 0.18 GPa | 0.019 GPa |
| High temperature stability | Stable at 300° C. | Destroyed at 250° C. |

Furthermore, the above structure can be further improved in strength by subjecting it to a heat treatment at about 600–900° C. which results in a further progression of vitrification and a higher density (thermal shrinkage).

The internal pores of the three-dimensional network structure thus obtained are filled with a resin. This filling can be achieved either by impregnating the structure with a resin-forming monomer and/or prepolymer and subjecting the impregnated structure to curing conditions (the second aspect of the invention) or impregnating the structure with a thermoplastic resin and subjecting the impregnated structure to curing conditions (the third aspect of the invention).

In the second aspect of the invention, said structure is immersed in an impregnating resin composition comprising a monomer and/or prepolymer capable of yielding a cured resin, where necessary supplemented with a curing agent, and after degassing if necessary, is caused to cure by, for example, heating. The monomer and/or prepolymer mentioned above is not critical in kind but is preferably a substance that is liquid at atmospheric temperature, thus including those monomers and/or prepolymers which are generally used for the production of epoxy resin, polyimide resin, unsaturated polyester resin, silicone resin, phenolic resin and so on. As such monomers for thermoplastic resins, methyl methacrylate, vinyl acetate, dichlorophenylsulfonic acid, styrene, etc. can be mentioned.

In the third aspect of the invention, said structure is immersed in an impregnating resin composition comprising a thermoplastic resin, such as a polyethylene, polypropylene, polyamide, poly(vinyl chloride), or methacrylic resin, either reduced in viscosity or melted by heating, and then cooled to cure. The thermoplastic resin mentioned above is not critical in kind but is preferably a resin of low melt index.

In the second and third aspects of the invention, said completely filled composite can be obtained by allowing the impregnating resin to cure while the structure remains immersed therein.

On other hand, when the structure is taken out from the impregnating resin composition and, then, allowed or caused to cure, said incompletely filled composite is obtained. Thus, when the structure is immersed in the impregnating resin composition, some of the resin finds its way into the surface pores (5–10 nm in diameter) of silica particles and gets adhered to or adsorbed on the surfaces of the open pores of the structure but the remaining resin finds its way out of the structure before curing with the result that at least part of the open porosity remains unfilled after curing to give said incompletely filled composite. Compared with the completely filled composite, the incompletely filled composite has a high silica (inorganic)/resin (organic) ratio and is a material comparatively light in weight and having a greater specific strength and a higher heat resistance. The resin impregnation rate of such an incompletely filled composite can be freely controlled according to the kind of impregnating resin, physical properties of said structure, and other factors.

The fourth aspect of the invention utilizes a three-dimensional network structure in which its constituent spherical silica particles are not covered with a water-soluble polymer. Specifically, whereas the spherical silica particles constituting the three-dimensional network structure are covered with a water-soluble polymer, this structure is heat-treated at a temperature not below the decomposition temperature of said water-soluble polymer either as it is or after washing with water if necessary to completely remove the water-soluble polymer. The heat-treating temperature depends on the decomposition temperature (kind) of the water-soluble polymer but is generally not less than about 500° C. The composite according to the fourth aspect of the invention is fundamentally identical with the first aspect of the invention except that the water-soluble polymer is not present.

The fifth and sixth aspects of the invention are concerned with the production technology for the composite according to the fourth aspect of the invention and are identical with the second and third aspects of the invention except that the structure available upon removal of the water-soluble polymer from the third-dimensional network structure according to the first aspect of the invention is employed.

In accordance with the present invention, the following meritorious results can be obtained. Thus, by the production methods according to the second and third aspects of the invention, a three dimentionally connected silica spheres-resin composite having a novel construction and characteristic physical properties (the first aspect of the invention) can be provided. According to the fifth and sixth aspects of the invention, a three dimensionally connected silica spheres-resin composite having another novel construction and characteristic physical properties (the fourth aspect of the invention) can be obtained.

Since each of the composites of the present invention (the first and fourth aspects of the invention) is an interlocked assemblage of said three-dimensional network structure with said resin, its strength is substantially retained even at high temperatures where the organic matter undergoes pyrolysis or burn-out.

Moreover, unlike the conventional inorganic particle-packed composite, the above composite shows no appreciable loss of elastic modulus at the glass transition point of the resin and has a unique characteristic that it rather shows an increase in the modulus of elasticity in the high temperature region.

Furthermore, because its silica particle skeletal phase is a predominantly open cell structure, the above composite shows good flexibility in the temperature region where the resin is not decomposed, in spite of its high inorganic packing or fill rate.

EXAMPLES

The following examples and comparative examples illustrate the characteristic features of the present invention.

Example 1
(a) Production of the three-dimensional network structure

A tetramethoxysilane low polymer (trademark "MS 51"; product of Mitsubishi Chemical; polymerization degree n=4; 14 parts) was blended, at 25° C., with 10 parts of special grade ethyl alcohol and 16 parts of a 25% aqueous solution of polyacrylic acid (viscosity at 30° C.: 8000–12000 cps), then 0.5 part of 36% hydrochloric acid was added, and the mixture was stirred for 10 minutes and then allowed to stand at 25° C. for allowing the hydrolysis and polymerization reactions to proceed. After about 2 weeks of standing, the reaction mixture solidified to give a block-like matter.

The thus-obtained three-dimensional network structure comprising spherical silica particles had the following physical properties.

(1) It comprises three-dimensionally interconnected spherical silica particles having a diameter of 6 to 8 $\mu$m;

(2) Said spherical silica particles have, on the surface thereof, pores having a radius of 5 to 7 nm and have a specific surface area of 320 to 350 m$^2$/g;

(3) The cross-sectional area of the bond interconnecting two spherical silica particles is within the range of ⅓ to ¼ of the maximum cross-sectional area of that particle smaller in maximum cross-sectional area;

(4) The particle surface of said spherical silica particles is about 98% covered with polyacrylic acid;

(5) There are mutually communicating voids formed within said network structure and the void content is about 44% on the whole network structure basis;

(6) The silica content is 65% by weight on the whole network structure basis;

(7) When said network structure is heat-treated by keeping in air both at 600° C. for 5 hours and at 800° C. for 3 hours, the network structure substantially remains intact;

(8) Said network structure can undergo machining such as shaping and has an elasticity modulus of 1.75 GPa at ordinary temperature (25° C.) and an elasticity modulus of 0.18 to 0.25 GPa at temperatures between the glass transition point and 300° C.

This structure was examined under a scanning electron microscope. The result is illustrated in FIG. 1.

(b) Production of a composite consisting of a silica particle skeleton and a resin The above three-dimensional network structure was immersed in a mixture of 50 parts of epoxy resin (Epikote 807™, Shell Petrochemical) and 54 parts of the curing agent methylhimic anhydride supplemented with 1 ml of a cure accelerator tertiary amine and after 3 hours of degassing at 50° C. (until the evolution of gas ceased), the curing reaction was carried out and at 100° C. for 2 hours and at 200° C. for 2 hours. The system was then allowed to cool gragually to provide a pale yellow silica-epoxy resin composite.

The dynamic elastic modulus values and breakdown temperature of the composite obtained are shown in the following table. For comparison, the data on the known epoxy composite loaded with microfine silica particles (average particle diameter 1 $\mu$m) (silica powder: epoxy resin=53:47) are also shown.

| | This Invention | Epoxy composite |
|---|---|---|
| Elastic modulus (25° C.) | 4.42 GPa | 6.51 GPa |
| Elastic modulus (250° C.) | 0.17 GPa | 0.036 GPa |
| Elastic modulus (370° C.) | 0.40 GPa | — |
| Breakdown temperature | ≧400° C. | 280° C. |

It can be seen from the above data that despite its satisfactory elastic modulus around atmospheric temperature, the conventional epoxy resin composite undergoes a sharp decrease in the modulus at 250° C. and even collapsed at 280° C.

In contrast, the composite of this invention has the unique characteristic that its elastic modulus decreases at the glass transition temperature (121° C. (dynamic elastic modulus measured at 3.5 Hz)), retains this level up to about 250° C., then shows a steady increase in elastic modulus with increasing temperature, exhibits a maximum modulus at 370° C., and retains this value up to 400° C.

Example 2

The same three-dimensional network structure as that used in Example 1 was immersed in a mixture of 150 parts of epoxy resin (Epikote 807™, Shell Petrochemical) and 162 parts of the curing agent methylhimic anhydride supplemented with 1 ml of dimethylbenzylamine and after 3 hours of degassing at 60° C. for sufficient penetration of the epoxy resin into the silica particle pores. The three-dimensional network structure was taken out from the mixture and the curing reaction was carried out at 100° C. for 2 hours and, then, at 200° C. for 2 hours. The structure was then allowed to cool gradually to provide a pale brown silica-epoxy composite.

In this composite, the surface of open cells of the skeletal silica particle three-dimensional structure had been covered with the epoxy resin and the size of open cells had been decreased by the thickness of the epoxy resin layer.

Example 3

A mixture of 100 parts of novolac epoxy resin (Epikote 152™, Shell Petrochemical) and 34 parts of the curing agent diphenylaminosulfone was heated at 60° C. and the same three-dimensional network structure as that described in Example 1 was immersed. After about 2 hours of degassing at 60° C., when gas evolution had ceased, the structure was withdrawn from the mixture and the curing reaction was conducted at 175° C. for 18 hours to provide a dark brown composite having epoxy resin-clad open cells.

Example 4

The same three-dimensional network structure as that described in Example 1 was heat-treated for thermal shrinkage at 800° C. for 3 hours. Then, as in Example 1, it was immersed in an epoxy resin-methylhimic anhydride mixture, subjected to degassing at 50° C. for about 1 hour (until the evolution of gas ceased), cured at 100° C. for 2 hours and at 200° C. for 2 hours, and allowed to cool gradually to provide a pale yellow silica-epoxy resin composite.

Since this composite was hard and high in rigidity, it was found that the properties of the thermally shrunken silica three-dimensional network structure were dominant. SEM observation showed that this product was a solid composite comprising a three-dimensional network structure completely filled with epoxy resin.

Example 5

The same three-dimensional network structure as that described in Example 1 was heat-treated at 600° C. for 5 hours. This heat-treatment caused about 10% shrinkage of the structure one-dimensionally but the three-dimensional structure was still retained. This heat-treated three-dimensional structure was immersed in an epoxy resin-methylhimic anhydride mixture as in Example 1. After about 2 hours of degassing at 50° C., the structure was withdrawn from the mixture and cured to provide a pale yellow three-dimensional silica-epoxy resin composite in which the surfaces of the interconnected silica particles have been covered with the epoxy resin. SEM examination revealed that this composite still had some residual open porosity.

Example 6

The same three-dimensional network structure as that described in Example 1 was immersed in a molten polyamide (nylon 6) at 230° C. in a vessel equipped with degassing means and the evolved gas was removed for about 30 minutes as the structure was allowed to cool. The structure was then cooled under atmospheric pressure to provide a whitish pale yellow completely filled silica-polyamide composite.

We claim:

1. A method for preparing a three dimensionally connected silica spheres-resin composite, which comprises hydrolyzing and polymerizing a low molecular weight polyalkoxysilane in the presence of an acid catalyst in a mixed solution of said low molecular weight polyalkoxysilane and a water-soluble polymer in a solvent mixture of water and alcohol to obtain a three dimensional connected silica spheres, impregnating the three dimensional connected silica spheres with at least one material selected from resin-forming monomers and resin-forming prepolymers, and curing the material, said low molecular weight polyalkoxysilane having 4 to 10 monomers each having an alkoxy group containing 1 to 4 carbon atoms.

2. A method for preparing a three dimensionally connected silica spheres-resin composite, which comprises hydrolyzing and polymerizing a low molecular weight polyalkoxysilane in the presence of an acid catalyst in a mixed solution of said low molecular weight polyalkoxysilane and a water-soluble polymer in a solvent mixture of water and alcohol to obtain a three dimensional connected silica spheres, impregnating the three dimensional connected silica spheres with a thermoplastic resin, and curing the resin, said low molecular weight polyalkoxysilane having 4 to 10 monomers each having an alkoxy group containing 1 to 4 carbon atoms.

3. A method according to claim 1 or 2, wherein the water-soluble polymer is at least one member of the group consisting of polyacrylic acid, polyethylene glycol, polyvinyl alcohol, polyvinyl acetate, water-soluble proteins, and sodium polystyrenesulfonate.

4. A method according to claim 1 or 2, wherein the proportions of the alkoxysilane low polymer and water-soluble polymer are such that the water-soluble polymer amounts to 10 to 40 parts by weight per 100 parts by weight of the alkoxysilane low polymer.

5. A method according to claim 1 or 2, wherein the alcohol in the water-alcohol mixed solvent is an alcohol containing 1 to 4 carbon atoms.

6. A method according to claim 1 or 2, wherein the concentration of the alcohol in the water-alcohol mixed solvent is 40 to 60% by weight.

7. A method according to claim 1 or 2, wherein the acid catalyst is at least one member of the group consisting of hydrochloric acid, nitric acid, sulfuric acid, acetic acid, oxalic acid and formic acid.

8. A method as claimed in claim 1, further comprising decomposing said water-soluble polymer before said impregnating said three dimensional connected silica spheres.

9. A method as claimed in claim 2, further comprising decomposing said water-soluble polymer before said impregnating said three dimensional connected silica spheres.

* * * * *